United States Patent [19]

Mowry, Jr.

[11] Patent Number: 5,757,275
[45] Date of Patent: May 26, 1998

[54] FAULT MONITORING TECHNIQUE FOR PROGRAMMABLE LOGIC CONTROLLERS

[75] Inventor: Stephen Weeks Mowry, Jr., Kingsport, Tenn.

[73] Assignee: Siemens Energy & Automation, Inc., Alpharetta, Ga.

[21] Appl. No.: 586,014

[22] Filed: Dec. 29, 1995

[51] Int. Cl.$^6$ ................................... G08B 21/00
[52] U.S. Cl. ..................... 340/664; 340/657; 340/661; 340/660
[58] Field of Search .................. 340/664, 657, 340/661, 662; 364/483

[56] References Cited

U.S. PATENT DOCUMENTS

| | | | |
|---|---|---|---|
| 3,641,546 | 2/1972 | Blackburn | 340/661 |
| 4,077,061 | 2/1978 | Johnston et al. | 364/483 |
| 4,311,994 | 1/1982 | Kuribayashi | 340/661 |
| 4,322,771 | 3/1982 | Struger | 361/104 |
| 4,612,445 | 9/1986 | Neri | 250/551 |
| 4,771,403 | 9/1988 | Maskovyak et al. | 364/DIG. 2 |
| 4,774,656 | 9/1988 | Quatse et al. | 364/DIG. 2 |

OTHER PUBLICATIONS

National Semiconductor Corporation's Linear Databook 2, pp. 7–74, Simple Floating Current Detector 1988.
Gayakwad, Op–Amps and Linear Integrated Circuits, Second Edition, pp. 331–332 1988.
European Search Report received on PCT Application No. US 96/19615.

Primary Examiner—Jeffery Hofsass
Assistant Examiner—Sihong Huang

[57] ABSTRACT

An isolated fault monitoring circuit for a AC port in an AC I/O module for a programmable logic controller is taught. Briefly stated, a bridge circuit is series connected to a fuse and an optocoupler. When the fuse which is in series with the AC input line is blown, the output of the optocoupler produces a voltage one-half of that during steady state operation thereby causing one of two comparators to go high which in turn causes an LED to light indicating a blown fuse. Should the AC input line be disconnected or otherwise not present, the optocoupler produces no output which thereby causes the second of the two optocouplers to have its output go high thereby causing a second of the two LEDs to light so indicating that condition. At any time during the fault condition only one of the LEDs will light, while no LEDs are lit during steady state operation.

3 Claims, 1 Drawing Sheet

5,757,275

FAULT MONITORING TECHNIQUE FOR PROGRAMMABLE LOGIC CONTROLLERS

FIELD OF THE INVENTION

This invention relates generally to an isolated fault monitoring circuit and more particularly to a fault monitoring circuit for a programmable logic controller utilizing a single optocoupler which isolates the logic side of the programmable logic controller from external AC inputs.

BACKGROUND OF THE INVENTION

Programmable logic controllers are finding increasing acceptance in a variety of environments ranging, for example, from process and apparatus control in a factory and recently to vending machines and the like. As such, there is a great variance in the types of devices they must interact with. In this regard, programmable logic controllers (PLC's) utilize what are commonly referred to as input/output (I/O). These modules can vary greatly in the types of signals they produce or receive. However, they generally fall into one of two categories, a digital I/O or an analog I/O. Digital ports in an I/O module are relatively easy and simple to isolate due to the nature of digital signals, i.e. a pulsed digital signal, an on/off switch and the like.

However, analog ports in an I/O module are much more difficult to interface with because the range of inputs under certain conditions can be substantially greater than desired and hence will generally require more signal conditioning and the like. Moreover, for safety and circuit protection reasons, AC modules must be isolated from the module itself, that is the AC I/O terminals must be electrically isolated from the AC module itself.

Since, as mentioned, AC lines are subject to greater fault conditions or variances, there is a need for monitoring such AC faults. However, whenever isolation is utilized, it is difficult to monitor faults on the AC line and to transfer such fault conditions across an isolation boundary. Heretofore, a number of circuits have been utilized which accomplish this but which require a plurality of optically coupled devices and the like in order to detect simple fault such as a blown fuse or missing AC connections.

Accordingly, it is an object of the present invention to produce an isolated fault monitoring circuit for an AC I/O module which is to be used with a PLC which utilizes only a single optocoupler.

It is yet another object of the present invention to produce an isolated fault monitoring circuit which can detect blown fuses or missing AC connections and provide a separate indication of each.

It is yet another object of the present invention to produce an isolated fault monitoring circuit for an AC port in a programmable logic controller I/O module, comprising a bridge rectification circuit having an AC input and a DC output, an overcurrent device in series with a portion of the bridge rectification circuit such that after an overcurrent condition, the bridge rectification circuit produces a DC output only during one half of the cycle at the AC input, an optocoupler connected to the bridge rectification circuit for producing a output signal representative of the DC output of the bridge rectification circuit, a first and a second comparator connected so as to receive the output signal of the optocoupler and respectively producing first and second comparator output signals, and at least one semiconductor switching device connected each of the first and second comparator output signals, each of the at least one semiconductor switching devices connected to an associated light emitting diode, whereby upon the overcurrent condition, the first comparator output signal produces an output signal which causes the associated light emitting diode to conduct and thereby producing an indicative fault signal, and whereby upon loss of a signal from the AC signal, the second comparator output signal produces an output signal which causes the associated light emitting diode to conduct and thereby produces an indicative fault signal.

BRIEF DESCRIPTION OF THE DRAWING

Reference can be now had to FIG. 1 which is a simplified schematic diagram of the fault monitoring circuit of the present invention.

DETAILED DESCRIPTION OF THE PREFERRED EMBODIMENT

Figure 1:
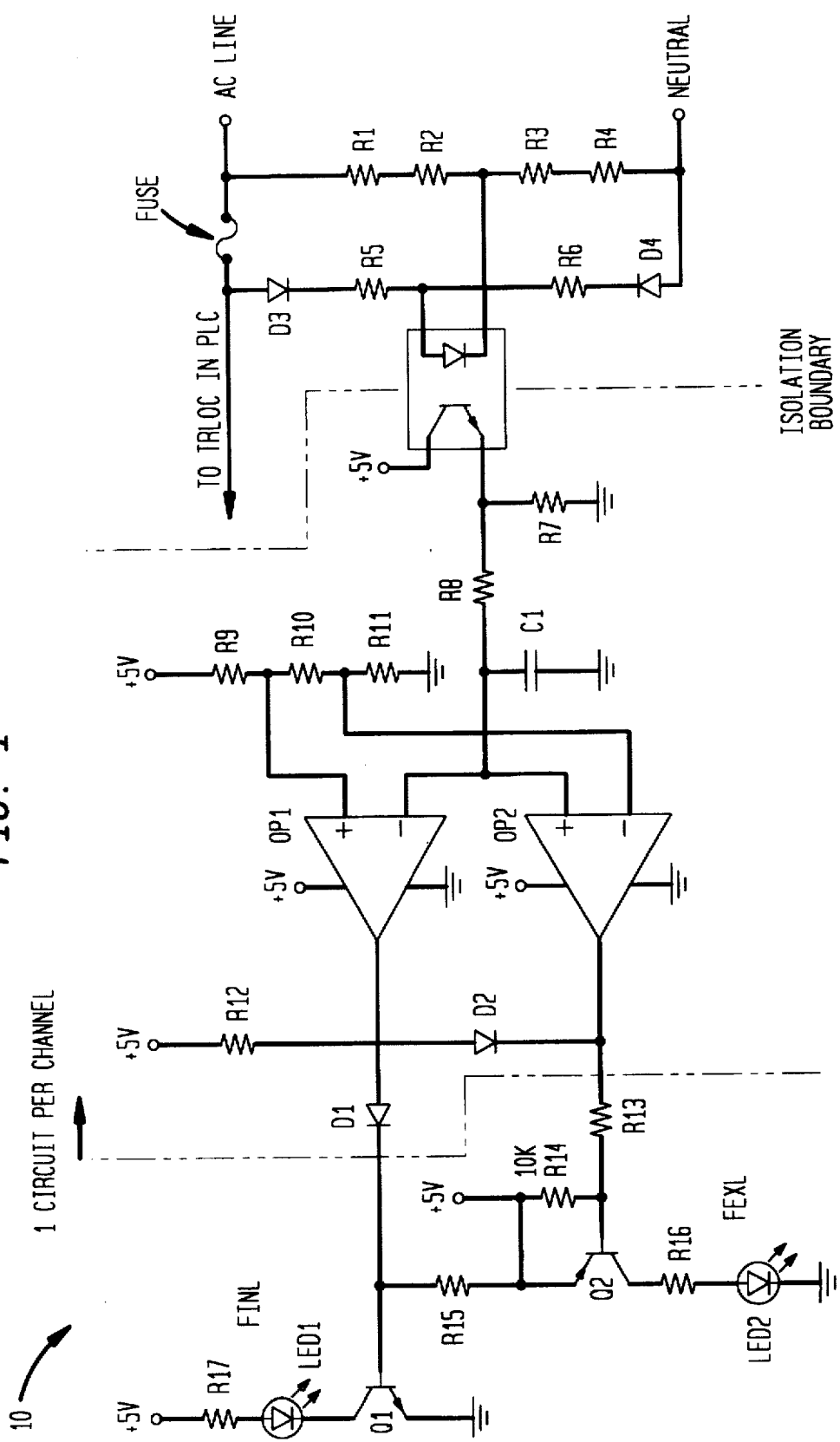

Reference may be now had to the FIG. (1) which is a simplified schematic diagram of the fault monitoring circuit of an AC port in an I/O module for use with a programmable logic controller. It is to be understood that this circuit would be used with one particular channel and that an I/O module having a plurality of ports or channels would have a similar circuit for each port or channel. Moreover, the use of AC I/O modules with programmable logic controllers is well known and understood by those skilled in the art and hence a detailed description of its interaction with and use in a PLC will not be described herein.

The port of an I/O module is shown generally at 10 and interacts with AC signals comprised of AC terminals having a line side and a neutral side as shown. The AC line side has one end of resistor R1 and a fuse connected to it. The remaining terminal of resistor R1 is connected to one terminal of resistor R2 with the remaining terminal of resistor R2 connected to one terminal of resistor R3 and one terminal of an LED contained in optocoupler OC1. The remaining terminal of resistor 3 is connected to one terminal of resistor 4 with the remaining terminal of resistor R4 connected to the neutral side of the AC I/O and one terminal of diode D4 so as to permit current flow through R4 to flow diode D4. The remaining terminal of diode D4 is connected to one terminal of resistor R6 with the remaining terminal of resistor R6 connected to one terminal of resistor R5 as well as the remaining terminal of the LED contained in optocoupler OC1.

The remaining terminal of resistor R5 is connected to one terminal of diode D3 with the remaining terminal of diode D3 connected to the remaining terminal of the fuse such that current will flow through the fuse, diode D3 and thence through resistor R5. This remaining terminal of the fuse is, in the preferred embodiment of the invention, also connected to a triac, for producing or receiving signals transmitted over the AC channel. This thereafter, as is typical and hence readily known to one skilled in the art of PLC I/O modules would directly interact with the logic portion (not shown) of an I/O module and thereafter directly with a PLC (not shown).

The light detector portion of optocoupler OC1 has a collector connected to the +5 volt rail with the terminal connected to one terminal of resistors R7 and R8. The remaining terminal of resistor R8 is connected to one terminal of capacitor C1 and the negative and positive input terminals of operational amplifiers OP1 and OP2 respectively. The remaining terminals of resistor R7 and capacitor C1 are each connected to ground.

In the preferred embodiment of the present invention, operational amplifiers OP1 and OP2 function as comparators. One terminal of resistor R9 is connected to the +5 volt rail with the remaining terminal of resistor R9 connected to one terminal of resistor R10 and the positive input terminal of operational amplifier OP1. The remaining terminal of resistor R10 is connected to one terminal of resistor R11 and the negative input terminal of operational amplifier OP2. The remaining terminal of resistor R11 is connected to ground.

Operational amplifiers OP1 and OP2 are preferably powered by +5 volt and ground as shown. The output of operational amplifier OP1 is connected to one terminal of resistor R12 and one terminal of diodes D1 and D2 (such that output current from OP1 will flow through diode D1 and D2) while the remaining terminal of resistor R12 is connected to the +5 volt rail. One terminal of diode D2 is connected to the output of operational amplifier OP2 (such that current flowing out of OP2 will not flow through diode D2) and also to one terminal of resistor R13. The remaining terminal of resistor R13 is connected to one terminal of resistor R14 and the base transistor Q2. The remaining terminal of resistor R14 is connected to the +5 volt rail and to one terminal of resistor R15 and to the emitter of transistor Q2. The collector of transistor Q2 is connected to one terminal of resistor R16 with the remaining terminal of resistor R16 connected to one terminal of LED 2 so as to let current flow through resistor R16 and diode LED 2. The remaining terminal of LED 2 is connected to ground thereby continuing a current path.

The remaining terminal of diode D1 is connected to the remaining terminal of resistor R15 and to the base of transistor Q1. The emitter of transistor Q1 is connected to ground while the collector of transistor Q1 is connected to one terminal of LED 1 such that current flowing through LED1 thereafter flow into the collector of Q1. The remaining terminal of LED 1 is connected to one terminal of R17 with the remaining terminal of resistor R17 connected to the +5 volt rail. As described more fully below LED 1 and LED 2 are referred to as Fint (Fault Internal) and Fext (Fault external).

With respect to operation of the present circuit, it can be seen that the LED portion of optocoupler OC1 (which acts as an isolation boundary) is connected in pseudo-bridge configuration between the voltage divider consisting of resistors R1, R2, R3 and R4 and rectifier diodes D3 and D4. Resistors R5 and R6 serve to limit the avalanche current through diodes D3 and D4 should a fast transient occur on the EC line voltage and momentarily break down either diode D3 or D4. The fuse acts as a connection in the bridge circuits such that when the fuse is present, current will flow through diode D3, resistor R5, the LED of optocoupler OC1, resistor R3 as well as resistor R4 during the positive half-cycle of the AC line voltage. Similarly, current will flow through diode D4, resistor R6, the LED of optocoupler OC1, resistors R2 and R1 during the negative half-cycle of the AC line voltage. This pseudo-bridge configuration effectively forms a full wave rectification of the LED current in optocoupler OC1 thereby generating a pulsating DC voltage waveform at the emitter of optocoupler OC1 which in turns feeds a low pass filter comprised of resistor R8 and capacitor C1. In the preferred embodiment of the present invention, the DC component of the voltage on capacitor C1 will always be greater than 3 volts DC (due to the 5 volt rail be utilized) when the fuse is installed and conducting current.

The voltage across capacitor C1 is sensed by the window comparator made up of comparators or operational amplifiers OP1 and OP2. In the preferred embodiment of the present invention, these comparators are LM339 type which are readily available from a variety of companies such as, for example, Motorola Corporation of Illinois. A reference divider which is comprised of resistors R9, R10 and R11 generates 3 volt and 1 volt DC references for comparators OP1 and OP2, respectively, from the 5 volt DC rail. If the voltage across capacitor C1 is greater than 3 volts DC, the output of comparator OP1 is low while the output of the bottom comparator OP2 is high. As a result, the diode logic on comparators OP1 and OP2 cause transistors Q1 and Q2 to both be off with the result that fault LED1 and LED2 (Fint and Fext) are also off.

Should the output fuse be blown due to, for example, excessive current, the LED current for optocoupler OC1 will only flow on the negative half-cycle of the AC line voltage, that is, through diode D4, resistor R6, the LED of optocoupler OC1, resistors R2 and R1. This therefore generates a pulsating DC voltage at the output of the optocoupler OC1 with a duty cycle equal of one-half of that when a fuse is present. As such, the low pass filter value of this voltage will always be between 1 volt and 3 volts DC (hence less than the normal value of 3 volts DC as described above). Under these conditions, the upper comparator OP1 output will switch high and allow transistor Q1 to turn on through resistor R12 and blocking diode D1. This will therefore illuminate the internal fault LED1 (Fint). Further, in this condition, the lower comparator output of OP2 will remain in the high state such that external fault LED2 (Fext) will remain off.

In the event that the AC line or neutral connection are not present, no current can of course flow through the LED in optocoupler OC1. As such, the voltage across C1 is zero (0). This condition therefore causes the output of lower comparator OP2 to switch low which in turn turns on transistor Q2 and thereby illuminates LED2 (Fext), indicating an external fault. Simultaneously, diode D2 which is connected between the output terminals of comparators OP1 and OP2 causes the voltage on upper comparator OP1 to be low and thereby prevents the internal indicator LED1 (Fint) from turning on during this "missing wire fault condition". As such, the user can readily determine whether an AC wire is simply not connected properly or whether excess current has flowed through over the AC line. Finally, it can be seen that the present circuit completely isolates the AC line from the enunciator portion while providing clear and unequivocal indication of the status or fault conditions present.

It is to be understood that many variations of the present invention may be practiced without departing from the spirit and scope of the present invention. For example, different voltage rails may be utilized while the fault conditions Fint and Fext conditions may be enunciated by different devices rather than LEDs. Additionally, resettable fuses or other types of devices may be utilized which react to overcurrent conditions other than the fuse as shown.

It is also to be understood that the present invention is not to be limited by the description herein but only by the claims appended hereto.

What is claimed is:

1. An isolated fault monitoring circuit for an AC port in a programmable logic controller I/O module, comprising:
   a full wave bridge rectification circuit having an AC input and a DC output;
   an overcurrent device in series with a portion of said bridge rectification circuit such that after an overcurrent condition, said bridge rectification circuit produces a DC output only during one half of a cycle at the AC input;
   an optocoupler connected to said bridge rectification circuit for producing a output signal representative of the DC output of said bridge rectification circuit;

a first and a second comparator connected so as to receive said output signal of said optocoupler and respectively producing first and second comparator output signals; and at least one semiconductor switching device connected to each of said first and second comparator output signals, each of said at least one semiconductor switching devices connected to an associated light emitting diode, whereby upon said overcurrent condition, said first comparator output signal produces an output signal which causes said associated light emitting diode to conduct and thereby producing an indicative fault signal, and whereby upon loss of a signal from said AC port, said second comparator output signal produces an output signal which causes said associated light emitting diode to conduct and thereby produces an indicative fault signal.

2. An isolated fault monitoring circuit for an AC port in a programmable logic controller I/O module according to claim 1 wherein said overcurrent device is comprised of a fuse.

3. An isolated fault monitoring circuit for an AC port in a programmable logic controller I/O module according to claim 1 further comprising a programmable logic controller operatively connected to said I/O module.

* * * * *